United States Patent [19]

Parker

[11] Patent Number: 5,186,731
[45] Date of Patent: Feb. 16, 1993

[54] METHOD AND COMPOSITIONS FOR PROMOTING MUSHROOM GROWTH

[76] Inventor: Frank H. Parker, Ballstone Farm, Quarnford, Nr. Buxton, Derbyshire, England, SK17 OSZ

[21] Appl. No.: 622,963

[22] Filed: Dec. 6, 1990

[30] Foreign Application Priority Data

Mar. 6, 1990 [GB] United Kingdom ............. 9004963
May 1, 1990 [GB] United Kingdom ............. 9009774
Jul. 3, 1990 [GB] United Kingdom ............. 9014769

[51] Int. Cl.$^5$ .................. C05F 9/04; C05G 3/00
[52] U.S. Cl. ........................... 71/5; 71/6; 71/9; 71/27; 47/1.1
[58] Field of Search ........................ 71/5-9, 71/25-27; 47/1.1

[56] References Cited

U.S. PATENT DOCUMENTS

| | | |
|---|---|---|
| 2,260,201 | 10/1941 | Stoller . |
| 3,377,152 | 4/1968 | Karcher . |
| 3,897,241 | 7/1975 | Washio et al. . |
| 3,942,969 | 3/1976 | Carroll, Jr. et al. ............ 71/5 |
| 4,018,591 | 4/1977 | Buttarelli . |
| 4,617,047 | 10/1986 | Bretzloff . |

FOREIGN PATENT DOCUMENTS

| | | |
|---|---|---|
| 49424/79 | 3/1983 | Australia . |
| 83/03041 | 9/1983 | Int'l Pat. Institute . |
| 214326A | 1/1985 | United Kingdom . |
| 2181122A | 4/1987 | United Kingdom . |

Primary Examiner—Ferris Lander
Attorney, Agent, or Firm—Bacon & Thomas

[57] ABSTRACT

A method of improving the yield of mushrooms which comprises supplementing the compost with an effective amount of a salt of an aliphatic, alicyclic or heterocyclic carboxylic acid, said salt being a calcium salt and/or a salt with an aliphatic, alicyclic or heterocyclic amine.

13 Claims, No Drawings

METHOD AND COMPOSITIONS FOR PROMOTING MUSHROOM GROWTH

This invention relates to growth promoters for mushrooms, to composts containing them and to improved processes for growing mushrooms.

It is known that improvements in yields of mushrooms can be made by increasing the quantity of proteins and other nutrients available to them.

To increase available nitrogen, composts have long been supplemented with crude proteins from sources such as soya bean, sunflower or rape meal. Proteins (such as soya) treated with heat or formaldehyde have also been used. This treatment is said to slow down the availability of protein to the mushrooms and hence improve the effect of the supplement.

However, supplementing composts in this way produces variable results. Using the untreated protein, in approximately 30% of batches, the yield is actually depressed, probably as a result of the liberation of a toxic concentration of ammonia by bacterial action. In about 40%, the yield is increased and the remainder are unaffected. Using formaldehyde or heat-treated protein gives little improvement; good results are still not achieved in 30% of batches. Further problems, such as the spread of wild moulds and uncontrollable increases in the temperature of the compost, arise with the use of conventional protein supplements which is largely due to the presence of carbohydrate and lipids in these supplements. There are further problems with the production of small fruit bodies.

It has been known in the mushroom trade that certain organic acids are present in normal composts. In the past attempts have been made to increase the amount of these acids to act as a growth promoter.

If the acids are used as glycerides the hydrolysis which occurs by bacterial and mycelial attack produces
a) a fatty acid, which except at very low levels exerts a toxic action on the mycelium, and
b) glycerol, which is an easily available nutrient for competing "weed" fungi, etc.

This means that only small amounts of fats or oils may be used—at considerable risk. The addition of free-fatty acids has given erratic results. Very small amounts of the higher molecular weight acids may be used beneficially, but lower molecular weight acids have never been used successfuly as growth promoters in conventional compost.

There is a need for an effective mushroom compost supplement which produces a significant and consistent enhancement in yield. It has now been found that certain salts of organic acids are effective.

In one aspect, my invention provides a method of improving the yield of mushrooms which comprises supplementing the compost with an effective amount of a salt of an aliphatic, alicyclic or heterocyclic carboxylic acid, said salt being a calcium salt and/or a salt with an aliphatic, alicyclic or heterocyclic amine.

In one embodiment, said salt is added to said compost or is formed therein by neutralisation. Alternatively said salt may be generated by prior bacterial fermentation of a carbohydrate and/or protein, either in situ in the compost, or to produce an acid-containing supplement for admixture with the compost. Suitable carbohydrate and/or protein may, for example, be present in vegetable matter.

Preferably from 10 to 100% of the organic acid is neutralised by calcium, the remainder being neutralised by said amine. For the supplementation of composts which are already high in nitrogen, it is preferable for 25 to 100% of the organic acid to be neutralised by calcium. For supplementing composts which are low in nitrogen, preferably 50-80% of the organic acid is neutralised by said aliphatic amine.

Another aspect of my invention is a supplement for addition to mushroom compost comprising a mixture of the calcium salt of one or more aliphatic, alicyclic or heterocyclic carboxylic acids and an aliphatic, alicyclic or heterocyclic amine salt of said acid.

A further aspect of my invention is a mushroom compost comprising a growth-promoting amount of a supplement as defined above.

The term "mushroom" is used herein to include any variety of *Agaricus spp.*, especially *Agaricus bisporus*.

The supplement of this invention produces a large enhancement in yield far more consistently than the supplements hitherto used. Without wishing to be bound by any theory of my invention, which is essentially empirical, I believe that the unusual efficacy of the supplement may be due in part to the fact that the supplement is particularly appropriate for mushroom metabolism and not suitable for the detrimental bacteria and fungi which can cause poor conditions in the compost for the mushroom mycelium.

The carboxylic acid may be mono-, di- or tribasic, alicyclic, heterocyclic or aliphatic, saturated or unsaturated, straight or branched-chain and may contain, for example, up to twenty carbon atoms, preferably from two to eighteen carbon atoms, most preferably from two to six carbon atoms, particularly four carbon atoms. Hydroxy acids or keto acids may be used. Preferred acids include acetic, propionic, butyric, lactic and pyruvic acids.

Dibasic acids also give particularly good results. A particularly preferred acid comprises one or more of succinic, maleic, malic, tartaric, fumaric, glutaric or adipic acids, optionally in admixture with a monocarboxylic acid. Examples of other suitable acids include: n-valeric, caproic, n-heptylic, caprylic, stearic, pelargonic, glycollic, $\alpha$ or $\beta$-hydroxypropionic, pimelic, suberic, azelaic, sebacic, saccharic, mucic, citric, furoic, gluconic, cyclohexanecarboxylic, hydroxybutyric and oleic, linoleic and linolenic acids. Such long-chain unsaturated acids often give excellent results.

One mixture of acids which is convenient to use in admixture with the compost is A.G.S. Acid, produced by BASF, Ludwigshafen. This is a mixture of 25–30% adipic acid, 42–47% glutaric acid and 25–30% succinic acid. Acidic plant materials such as lees from wine production (i.e. crude potassium hydrogen tartrate) may be used, as may apple wastes containing crude malic acid and salts thereof; such materials should be neutralised by calcium or the aliphatic or alicyclic amine.

Mixtures of monobasic and dibasic acids are particularly effective, for example a mixture of a $C_2$–$C_6$ monobasic acid with a $C_4$ to $C_6$ dibasic acid. Such mixtures may result from oxidative fermentation of a compost or pre-supplement containing long chain unsaturated fatty acids such as oleic and linoleic acids, which occur naturally in plant materials and manures.

The salt is believed to provide an important nutrient for the mushroom. Preferably, the combination of salt and compost is such that the resulting pH is from 7 to 9, most preferably from pH 8 to 8.5.

In addition the salt is believed to provide an antibiotic effect. The range of acids from acetic to myristic have a bacteriocidal and fungicidal action, the most active acid in this regard being propionic acid. Very low concentrations of the acids (as their salts) inhibit the development of the following mushroom parasites or competitors:

Ascomycetes: *Aspergillus niger, Aspergillus flavus, Aspergillus versicolor, Chaetomium globosum, Penicillium expansum, Penicillium funiculosum, Penicillium spinulosum, Trichoderma viride,*

Fungi Imperfecti: Cladosporium Sp., *Verticillium malthousei, Verticillium albo-atrum,*

Bacteria: *Pseudomonas aeruginosa, Pseudomonas fluorescens.*

Trials have shown that use of a compost containing the supplement according to the present invention gave a reduction in the order of 75% of the amount of competitor moulds as compared with use of a standard unsupplemented compost. When compared to the use of a compost supplemented by formaldehyde treated soya, the reduction of competitor moulds obtained by use of a compost supplemented according to the present invention may be as much as 95%.

The amine may be optionally substituted, saturated or unsaturated, straight or branched-chain or cyclic and may contain, for example, up to twenty carbon atoms, preferably two to six carbon atoms. The amine may be primary, secondary or tertiary. It may be substituted, e.g. by one or more hydroxyl groups.

Particularly preferred amines are ethylamine and triethylamine. Diethylamine is also preferred. Hydroxy amines include the ethanolamines, especially triethanolamine. Cyclic amines such as cyclohexylamine, furfurylamine or morpholine are also of interest. Diamines, especially ethylenediamine, may be effectively used, e.g. as the stearate salt. Amides corresponding to the above-defined aliphatic amines may find a place in my invention as nitrogen supplements.

The salt of the carboxylic acid may be added directly to the compost as a solid or in aqueous solution. The supplement may be added before or after spawning. The salt may, of course, be formed in situ by addition to the compost of the carboxylic acid, a suitable source of calcium if enough is not already present (e.g. calcium carbonate or calcium hydroxide, i.e. chalk or slaked lime) and optionally the aliphatic amine. The yield-enhancing effect of the calcium salt is often improved if an excess of calcium carbonate is present in the compost to buffer the increased metabolic activity.

A particularly preferred supplement according to the invention further comprises a phenolic compound.

The phenolic compound may be, for example, a catechol, a resorcinol or a polyfunctional tanning phenol such as a tannin (e.g. tannic acid), or especially lignin or a derivative thereof. I particularly prefer sulphonated derivatives, e.g. lignosulphonates and salts thereof, such as ammonium, alkali metal or alkaline earth metal salts, e.g. calcium salts. Such materials are available as by-products of the wood-processing industry, e.g. from papermills. Higher molecular weight fractions are preferred, e.g. Ultrazine CA and Borresperse CA (Borregard, Norway), or Eucalin (Kraft process waste from Empressa Nacional de Celulosa S.Q, Madrid).

An oxidising agent, for example, a peroxide may also optionally be included in a supplement containing a lignosulphonate.

The lignosulphonates are particularly effective in a supplement containing salts of one or more of the following acids: succinic, tartaric, malic, maleic, or fumaric acid.

The amount of supplement added to a compost will generally depend on the quality of the compost and may be, for example, from 4 to 20 kg solid supplement per tonne compost (0.4 to 2% by weight).

The supplement may be made available to the mushrooms at differing rates. For example, if heavy cropping over a short period is required, the supplement may be simply mixed with the compost; this increases the number of crops or cycles per year. Alternatively, the supplement may be adsorbed onto substrates such as clays, activated charcoals, peats, super absorbants or resins. If the components of the supplement are solid at room temperature, the supplement may be produced in the form of prills which may optionally contain an extender or inert buffer. In any of these forms, the availability of the supplement to the mushrooms is reduced. The immediate growth promoting effect of the supplement is therefore reduced, but the supplement is effective for longer periods. In these forms, the supplement can be effective for 6 to 7 flushes and is therefore more suitable for use in conventional mushroom farming practices.

Using supplemented composts according to the invention, increases in yields of about 20–80% may be obtained. This is a result of increases in both the weight of individual mushrooms and in the numbers of mushrooms.

Low-yielding strains, such as brown types of mushrooms, show very high increases in yield, e.g. around 30–80% even in good composts. The supplement of my invention thus enables these otherwise low-yielding strains to crop as well as the heavy-yielding white strains, which typically show an increase of around 20–50%. The brown strains command higher market prices, so my invention enables a very significant economic improvement to be made in the cultivation of such strains. In contrast with the conventional protein supplementation, there are no problems with increases in temperature in the compost, the spread of wild moulds or with the production of ammonium ion. Unlike the case with crude protein supplementation there are no problems with the production of small fruit bodies.

A further advantage is that the supplements can be initially produced in the form of a stable, free-flowing liquid which can be easily metered onto compost conveyer lines. The surfactant properties of the supplement make it possible to incorporate the supplement into a compost with a minimum of mixing. The supplements can also be diluted if necessary so that, after adding the supplement, the water content of a dry compost is adjusted to the appropriate level.

The production of an acid-containing supplement by bacterial fermentation of a carbohydrate and/or protein may be achieved by either i) the digestion of carbohydrate solutions or suspensions by acid-producing bacteria; or ii) the action of deaminating bacteria on solutions of amino acids produced by hydrolysis of protein sources; or iii) by employing a combination of methods i) and ii) above.

The acids produced by i) and ii) may be neutralized by calcium carbonate, calcium hydroxide or calcium oxide or by the synthetic amines defined above or by the amines produced by bacterial decomposition of protein via the decarboxylation of the amino acids. The products of such bacterial fermentation would contain the acids produced as salts of calcium or amine together with bacterial protein and such products may be used as supplements, optionally in the form of a concentrated suspension or in a spray dried form.

In an alternative embodiment, the supplementing of the compost with the salt may be achieved by the bacterial fermentation of a carbohydrate and/or protein either i) for the generation of acid or a source thereof in situ in the compost, or ii) for the production of an acidic biomass which may be added to a non-acidic compost optionally together with alkaline calcium salts and/or the amines defined above to provide the growth medium for the mushrooms.

In the generation of an acid by such bacterial fermentation, the remains of the vegetable matter are used to produce a mixture of bacterial protein and organic acid. The vegetable matter thus becomes selective for the growth of the mushroom (as opposed to that of the detrimental fungi and bacteria which may be present); i.e. the soluble or easily consumed carbohydrate becomes converted to organic acid(s) or mixtures thereof. The resultant matrix will therefore be a mixture of lignin and lignin cellulose suspended upon this and part adsorbed will be bacterial protein and calcium and amine salts of organic acids. The whole mixture will have a pH of between 7 and 8.5.

By way of an outline illustration of one example of the method for the generation of an acid or source thereof by bacterial fermentation of a carbohydrate and/or protein, moist vegetable material containing some soluble carbohydrates, proteins, hemicellulose etc., is fermented anaerobically with the naturally occuring homo and heterofermentive aciduric lactic acid bacteria. This results in the production of a biomass containing approximately 9.5% lactic acid and 1.5% acetic acid by dry weight. This acidic product may then be neutralized by calcium carbonate, calcium oxide or calcium hydroxide and/or amines as defined above to a stable pH of 7.8. The mixture may then be allowed to referment. The resultant mixture will then consist of cellulose, lignins, calcium and amino salts of one or more of lactic, acetic, butyrics, propionic, valeric, malic, citric, succinic, linolenic or linoleic acids, bacterial protein and free amino acid and may be used as compost.

Alternatively, part of the acidic biomass may be added to a conventional alkaline compost to provide the growth medium for the mushrooms. If the biomass used to generate the acid is of high water content, there will be a concentrated liquor produced which may be neutralized and used as a supplement.

After the acids have been generated by fermentation, it is advantageous to sterilise the supplement or compost, e.g. by heat, before inoculating it.

By way of an outline illustration of a further example of the method for the generation of an acid or source thereof by bacterial fermentation of a carbohydrate and/or protein, vegetable matter is fibrillated and suspended in a bacterial broth containing rumen innoculant under warm anaerobic conditions. The following Table illustrate the bacterial strains which may be employed and the acids produced.

| | Acids Produced |
|---|---|
| Cellulose Fermenting Strains | |
| *Bacteroides succinogenes* | Acetic, succinic |
| *Butyrivibrio fibrisolvens* | Butyric, formic, lactic |
| *Ruminococcus flavefacens* | Succinic, acetic, formic |
| Starch and Sugar Fermenting Strains | |
| *Bacteroides amylophilus* | Formic, acetic, succinic |
| *Succinivibrio dextrinosolvens* | Acetic, formic, succinic |
| *Selenomonas ruminantum* | Acetic, propionic |
| *Streptococcus Bovis* | Lactic |
| Lactic Ferementing Strains | |
| *Peptostreptococcus elsdenii* | Acetic, propionic, butyric, valeric |
| Deaminating Strains | |
| *Bacteroides ruminicola* | Formic, succinic, acetic, isobutyric and isovaleric acids. |

The mixture preferably contains some granular calcium carbonate to adsorb excess amounts of the acids as the fermentation proceeds, the amount of calcium carbonate being such that the pH does not rise above approximately 5.5. Once fermentation is complete, the acidic vegetable slurry may be neturalized by more calcium carbonate and/or amines, as defined above. The mixture may be either dried or part dried and may be used as a compost or compost additive. Alternatively, the acidic mixture may be used in part with a conventional alkaline compost. To reduce bulk the liquor may be extracted from the slurry and concentrated or spray dried for the production of a supplement. The supplement or compost should preferably be sterilised before inoculation of the compost.

Further embodiments of my invention are described by way of illustration only in the following non-limiting Examples:

EXAMPLE 1

A Supplement was prepared having the following composition:
500 ml water
150 g Borresperse N H (ammonium lignosulphonate) Borregard, Norway
70 g Ethylamine
10 ml Hydrogen Peroxide
50 g Succinic Acid

Method

The Borresperse N H and ethylamine were dissolved in boiling water (ammonia evolved) then allowed to cool. Hydrogen peroxide is then added slowly to oxidize lignosulphonate. Finally the mixture is titrated with succinic acid to pH 8-8.5

EXAMPLE 2

A Supplement was prepared having the following composition:
500 ml water
150 g Borresperse N H
50 g Tartaric Acid
70 g Ethylamine

Method

The Borresperse N H and tartaric acid were dissolved in boiling water and boiled for 5 minutes. The solution was cooled and 70 ml ethylamine added, the pH being adjusted to 8–8.5.

EXAMPLE 3

A Supplement was prepared having the following composition:
500 ml water
70 g A.G.S. Acid (produced by BASF, Ludwigshafen; composition: 25-30% adipic acid, 42-47% glutaric acid and 25-30% succinic acid)
15 ml 100 vol. hydrogen peroxide
140 ml triethylamine.

Method

The A.G.S. Acid was dissolved in warm water and allowed to cool. The hydrogen peroxide was added and then the triethylamine. The pH was adjusted to 8 to 8.5.

CROPPING TESTS

Standard 25 kg bags of peak heated compost were simultaneously mixed with 150 grams Le Leon C9 brown mushroom spawn plus the supplement under test. The bags were placed in a controlled environment room at 95% relative humidity and a temperature of 72° F. for 15 days. The bags were transferred to a growing room after casing and reduced to 60° F. over 5 days. The mushrooms were trimmed and weighed per bag per day. The following figures compare the growth promoting effect of the supplements of Examples 1, 2 and 3 with that of conventional supplements such as Spawnmate, Calprosyme, fish meal and soya powder.

| DAYS CROPPING | STANDARD NO ADDITION | 200 g SOYA POWDER | 200 g FISH MEAL | 100 g CALPROSYME | 200 g SPAWNMATE | EXAMPLE 1 SUCCINIC ACID | EXAMPLE 2 TARTARIC ACID | EXAMPLE 3 A.G.S. ACID |
|---|---|---|---|---|---|---|---|---|
| 1 | | | | | | | 315 | 760 |
| 5 | 200 | 375 | 400 | 595 | 420 | 70 | 980 | 1180 |
| 10 | 550 | 565 | 610 | 630 | 1510 | 70 | 2155 | 1180 |
| 15 | 1285 | 1420 | 875 | 2020 | 1800 | 1065 | 2285 | 2715 |
| 20 | 1285 | 1630 | 1680 | 2080 | 2795 | 2175 | 3145 | 3165 |
| 25 | 2270 | 2470 | 2265 | 3090 | 3075 | 3075 | 3145 | 3815 |
| 30 | 2270 | 2850 | 2650 | 3125 | 3565 | 3075 | 3575 | 3815 |
| 35 | 2445 | 3300 | 3095 | 3125 | 3775 | 4145 | 3575 | 4215 |
| 40 | 2745 | 3300 | 3245 | 3125 | 4115 | 4465 | 4110 | 4340 |
| 45 | 2955 | 3615 | 3400 | 3805 | 4395 | 5040 | 4470 | 4500 |
| 50 | 3100 | 3725 | 3400 | 4915 | 4695 | 5450 | 4950 | 5025 |
| | | | | Weight in Grams | | | | |

EXMAPLE 4

Portions of calcium carbonate (fine powder, 1 kg) were each neutralised with respectively tartaric acid (375 g), maleic acid (290 g) or AGS acid (350 g) each dissolved in water (3 l.).

The basic calcium salts so prepared were added directly to 250 kg of mushroom compost (2.1% nitrogen content) to make 10 bags of compost. Further supplemented composts were prepared by adding the following nitrogen supplements, with or without the above-mentioned basic calcium salts:
Denatured fish meal (200 g/bag);
Betamyl 1000 ("SpawnMate", a formaldehyde-denatured soya) (250 g/bag); or
Enzyme active cold milled soya (250 g/bag).

The supplemented composts, together with unsupplemented controls, were used in 5% day cropping trials after inoculation with Darlington 56 brown strain spawn. The results (g/10 bags) were as follows; all supplements are specified on a per bag basis and yields are trimmed weight:

| | 250 gm. per bag Betamyl 1000 | 200 gm. per bag Fish Meal | 250 gm. per bag Enzyme active Soya | No addition |
|---|---|---|---|---|
| No addition | 46555 | 45050 | 43850 | 40505 |
| A. ½ gm mole Calcium Tartrate | 49800 | 60965 | 49470 | 43835 |
| B. ½ gm mole Calcium Maleate | 54865 | 56270 | 57130 | 46250 |
| C. ½ gm mole Calcium AGS | 58800 | 60430 | 54820 | 44985 |

The following compositions are examples of mixtures for composts naturally containing moderate to good nitrogen content:

| Example 5. | Liquid for 25 kg compost at spawning:<br>55 ml 80% lactic acid<br>35 gm AGS acid<br>Dissolve in 500 ml hot water, cool,<br>add 35 ml triethylamine, cool,<br>add 50 gm fine chalk. |
|---|---|
| Example 6. | Solid for 25 kg compost at spawning:<br>70 gm AGS acid mixed with<br>100 gm gypsom,<br>add 30 ml ethylenediamine, cool,<br>add 50 gm calcium carbonate.<br>Mix and pellet. |
| Example 7. | Solid for 25 kg compost at spawning:<br>88 gm calcium butyrate mixed with<br>50 gm calcium carbonate.<br>Pellet. |
| Example 8. | Solid for 25 kg compost at spawning:<br>58 gm maleic acid<br>50 gm calcium sulphate (Gypsom) mixed together as powder;<br>add 70 ml triethylamine, cool,<br>add 50 gm calcium carbonate.<br>Mix and pellet. |

These compounds, together with a standard compost, were used in 60 day cropping trials after innoculation with Le Leon C9 brown strain spawn. The results (g/10 bags at 25 kg. per bag) were as follows; all yields are trimmed weight:

| Standard | 46305 |
|---|---|
| Example 5 | 63105 |
| Example 6 | 58115 |
| Example 7 | 63560 |

| | |
|---|---|
| -continued | |
| Example 8 | 65830 |

I claim:

1. A method of cultivating mushrooms comprising:
   (a) mixing mushroom spawn with compost and an effective amount of a compost supplement to enhance the yield of fruiting bodies; said supplement being a calcium and/or aliphatic, alicyclic or heterocyclic amine salt of an aliphatic, alicyclic or heterocyclic carboxylic acid;
   (b) allowing the mushroom mycelium to grow;
   (c) casing the compost with a casing layer to induce production of the fruiting bodies; and
   (d) cropping the developed fruiting bodies.

2. A method as claimed in claim 1 wherein from 25 to 100% of said acid is neutralised by calcium, the remainder being neutralised by said amine.

3. A method as claimed in claim 1 wherein from 50 to 80% of said acid is neutralised by said amine.

4. A method as claimed in claim 1 wherein said acid comprises a saturated or unsaturated monocarboxylic acid containing up to 20 carbon atoms, optionally having a hydroxy or keto substituent.

5. A method as claimed in claim 4 wherein said acid contains 2 to 6 carbon atoms and comprises acetic, propionic, butyric, lactic or pyruvic acids.

6. A method as claimed in claim 1 wherein said acid comprises a dicarboxylic acid containing 4 to 6 carbon atoms.

7. A method as claimed in claim 6 wherein said acid comprises one or more of succinic, maleic, malic, tartaric, fumaric, glutaric or adipic acids, optionally in admixture with a saturated or unsaturated monocarboxylic acid containing up to 20 carbon atoms, optionally having a hydroxy or keto substituent.

8. A method as claimed in claim 1 wherein said amine contains 2 to 6 carbon atoms and is optionally substituted by one or more hydroxy groups.

9. A method as claimed in claim 8 wherein said amine comprises ethylamine, diethylamine, triethylamine, triethanolamine or ethylenediamine.

10. A method as claimed in claim 1 wherein said compost is supplemented with from 0.4 to 2% by weight of said salt.

11. A method as claimed in claim 1 wherein said salt is added to said compost, or is formed in said compost by neutralisation.

12. A method as claimed in claim 1 wherein said salt is generated in situ in the compost by the bacterial fermentation of a carbohydrate and/or protein, or wherein an acidic biomass is produced by bacterial fermentation of a carbohydrate and/or protein and added to compost as a supplement, optionally together with a source of calcium and/or said aliphatic or alicyclic amine.

13. A method as claimed in claim 1 wherein said compost is further supplemented with a phenolic compound, especially a lignosulphonate.

* * * * *